United States Patent [19]

Leu

[11] Patent Number: 4,736,113
[45] Date of Patent: Apr. 5, 1988

[54] BUTTON-TYPE CODE CAR-SWITCH CONTROLLER

[76] Inventor: Jui-Shiuan Leu, Suite 17, 9Fl., No. 1, Sec. 2, Min Sheng Rd., Panchiao, Taipei, Hsien, Taiwan

[21] Appl. No.: 938,900

[22] Filed: Dec. 8, 1986

[51] Int. Cl.⁴ .......................... H02J 3/14; H02G 3/00
[52] U.S. Cl. .................. 307/10 AT; 361/172; 340/64; 340/825.32
[58] Field of Search .............. 307/10 AT; 340/63, 64, 340/825.32; 361/170–172; 123/179 BG, 198 B

[56] References Cited

U.S. PATENT DOCUMENTS

| | | | |
|---|---|---|---|
| 3,754,164 | 8/1973 | Zorzy | 361/172 |
| 4,186,710 | 2/1980 | Kilgore | 340/64 X |
| 4,320,382 | 3/1982 | Roucek | 340/64 |
| 4,342,024 | 7/1982 | Rossi | 340/64 |
| 4,347,545 | 8/1982 | Weishaupt et al. | 307/10 AT X |
| 4,437,153 | 3/1984 | Kamiyama et al. | 307/10 AT X |
| 4,438,426 | 3/1984 | Adkins et al. | 340/64 |
| 4,446,380 | 5/1984 | Moriya et al. | 307/10 AT |
| 4,492,959 | 1/1985 | Mochida et al. | 361/172 X |

Primary Examiner—William M. Shoop, Jr.
Assistant Examiner—Sharon D. Logan
Attorney, Agent, or Firm—Armstrong, Nikaido, Marmelstein & Kubovcik

[57] ABSTRACT

This invention relates to a button-type code car-switch controller, especially one which can turn on and off the car switches with the signal sent by the code operating circuit and control circuit formed by such electronic elements as transistor-transistor logic (TTL) and with the alarm interface circuit, can work together with various alarm systems so as to protect the car against thief, robbery and wire cutting-off. While the set code can be changed after the car switch is turned on, the alarm can be activated when a wrong code is keyed in. With this controller the car can be operated without conventional keys.

4 Claims, 3 Drawing Sheets

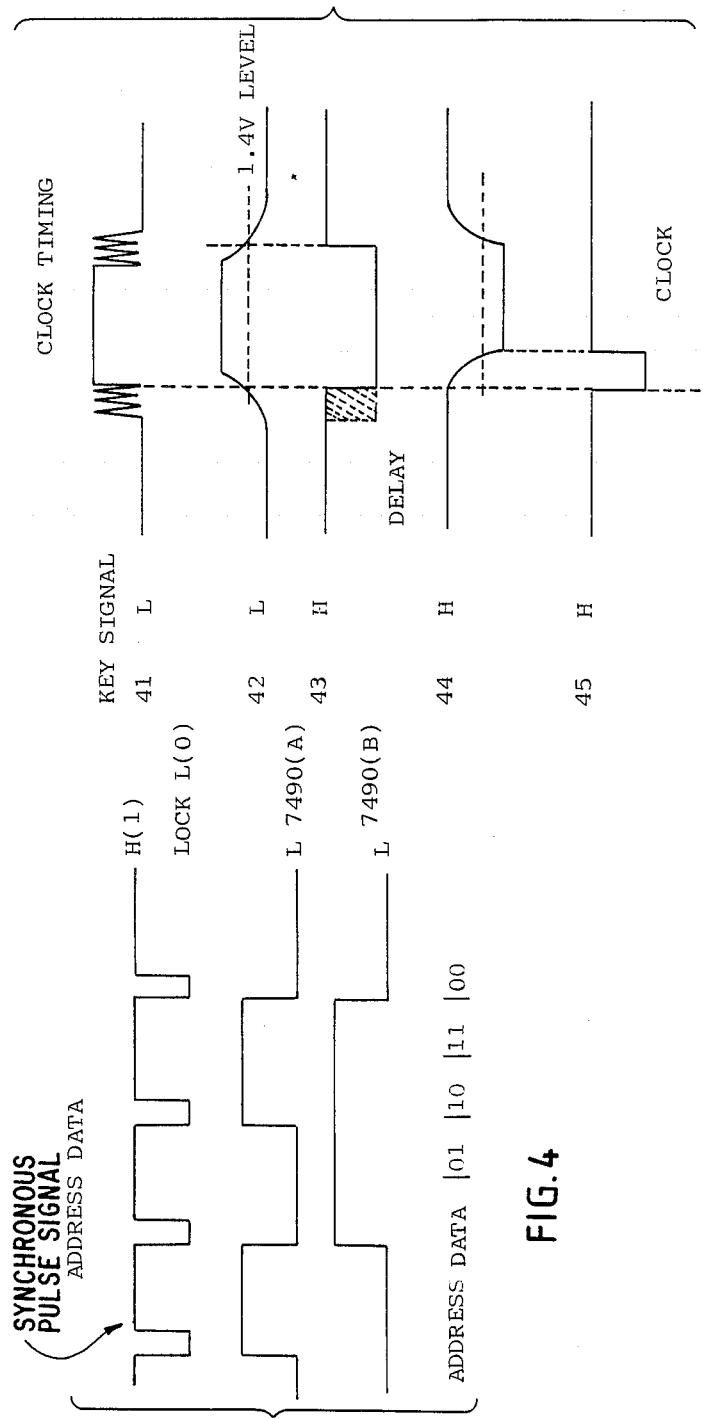

BUTTON-TYPE CODE CAR-SWITCH CONTROLLER

With scientific technology developing, button operation is becoming popular. Recently, some American motorhomes have been equipped with computer control systems to control the operation thereof by buttons. Such control systems are usually large and expensive, and are thus only used in large, luxury automobiles.

The present invention allows more people to enjoy such control systems. The practical and inexpensive car switch controller of the instant invention can be installed in any kind of automobile for push button operation without the need for conventional car keys. With an alarm interface circuit, it can be used together with anti-theft devices.

Generally, conventional electronic code controllers have secret numeral symbols to serve as memory code settings. They include fixed settings, semifixed settings and microprocessor controlled settings and have the following disadvantages:

1. Fixed code settings would be useless once they are known by others and are difficult to reset once the controller is installed in the car. Semifixed settings can eliminate some disadvantages of the fixed settings but they are also troublesome to reset.

2. Microprocessor code controllers have button keys and can change codes easily, but for setting and checking several codes, such controllers employ a central processing unit (CPU) and programmable read-only memory (PROM), read only memory (ROM), etc. Such components are almost equivalent to a personal computer. Such a set up would not only be expensive but also it would be too large to be used in the car.

3. Conventional code controllers are usually used for room doors, safes, etc., but not for car switches. They are less convenient than combination and time locks.

4. Conventional code controllers have no alarm systems and can not be used together with anti-theft devices. The odds are that thieves can try to open them.

SUMMARY OF THE INVENTION

The main object of the instant invention is to provide a button-type code car-switch controller which controls the car switches with changeable codes coded from keyed-in numbers and which can be used together with car door code controllers to form a complete car button control system for operating the car without keys.

Another object of this invention is to provide a button-type code car-switch controller which has an alarm control system to activate the alarm, a wire protector to activate the alarm when the wire is cut off, and an interface circuit to be connected with any make of anti-theft device to switch off the engine after a short delay after the car is stolen.

Still another object of this invention is to provide a button-type code car-switch controller which is low in cost, small in volume (about the size of two cigarette packages) and easy to install.

BRIEF DESCRIPTION OF THE DRAWINGS

FIG. 3 is a timing diagram of the clock generating circuit of the controller; and FIG. 4 is a timing diagram of the address selector of the controller.

DETAILED DESCRIPTION OF THE PREFERRED EMBODIMENT

Figure 1:
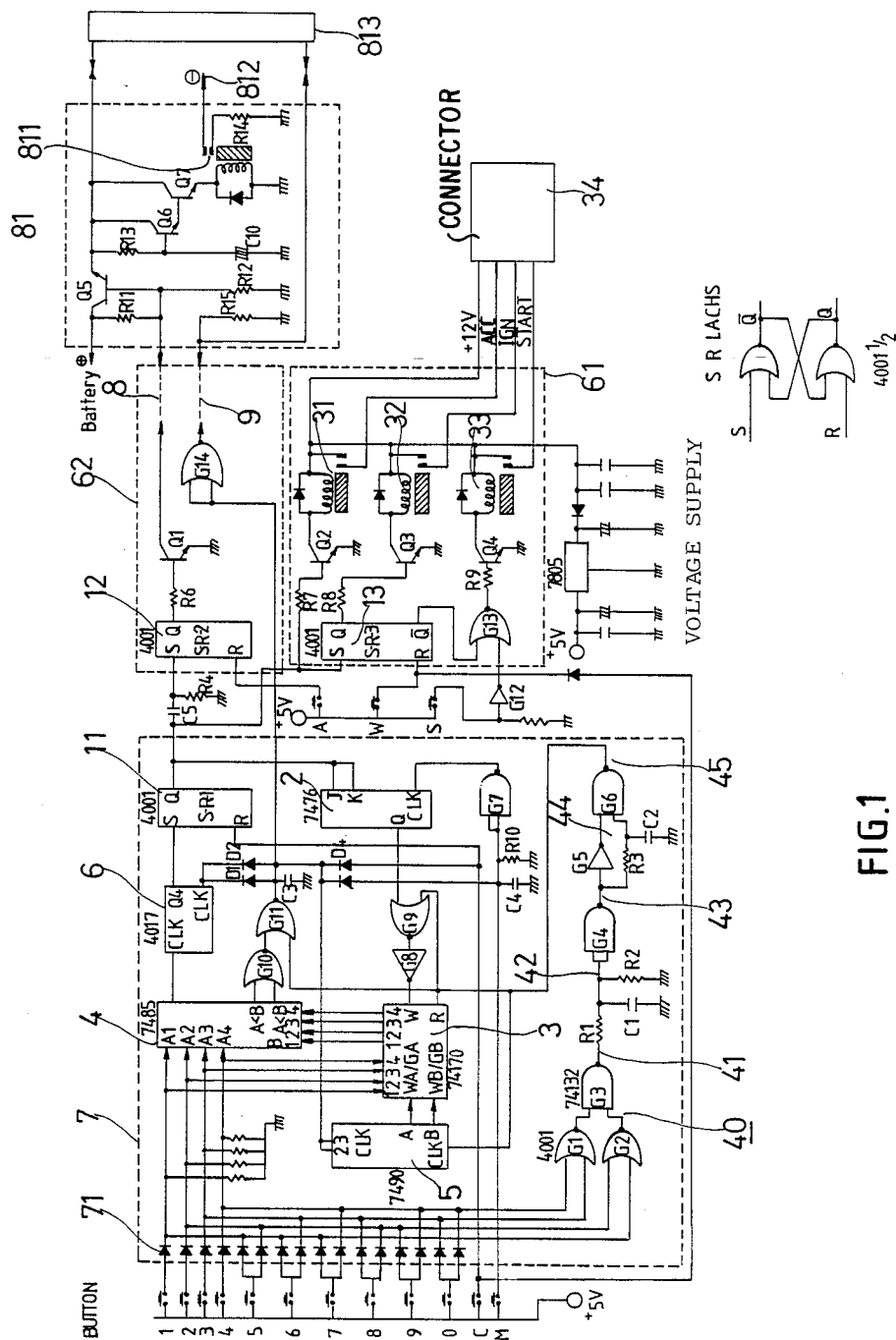
FIG. 1 is a schematic diagram of the button-type code car-switch controller of this invention.
Figure 2:
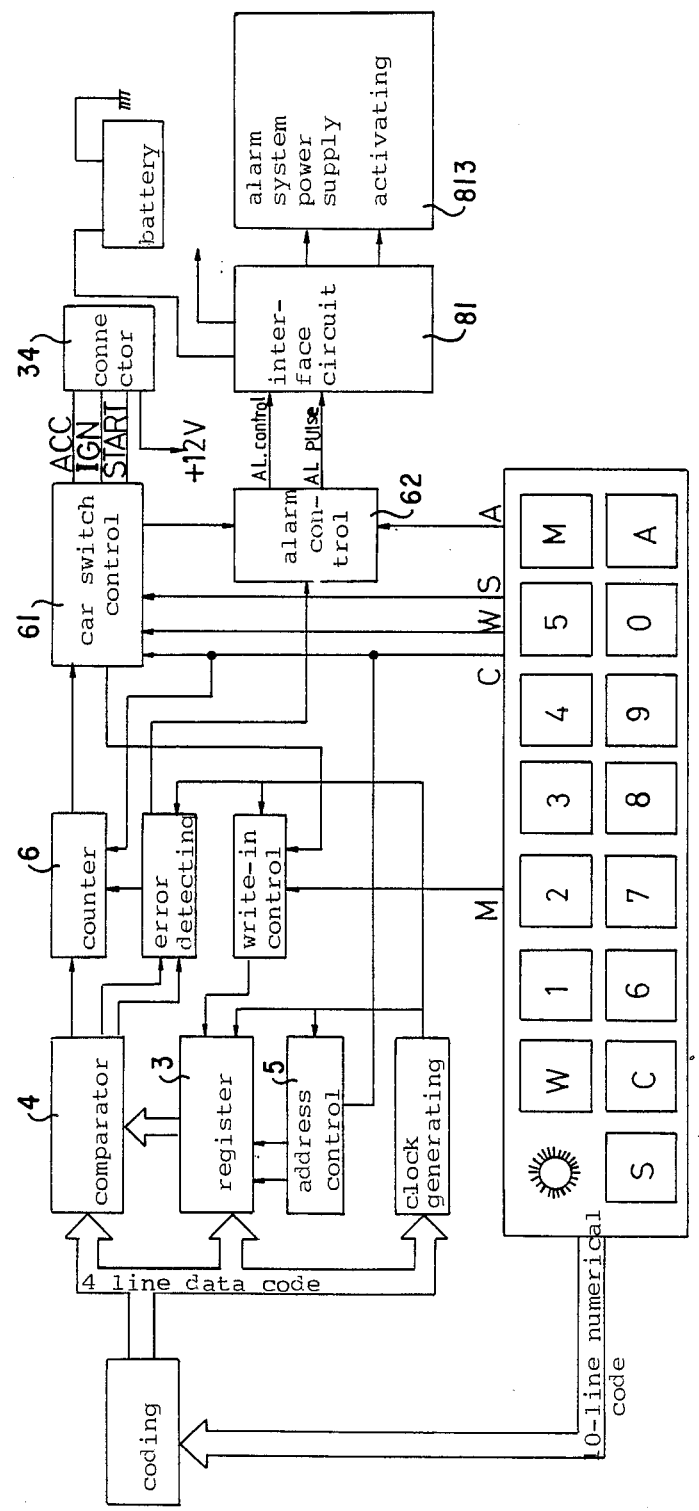
FIG. 2 is a block diagram of the instant invention.

Referring now to the drawings the construction and nature of the button-type code car-switch controller of this invention is described below.

As shown in FIG. 1, the keyboard 1 consists of ten keys carrying numerical codes from 0 to 10 and five keys carrying letters for manipulating the codes and controls of this invention. The five control keys are start key S, clear key C, memory key M, alarm key A and wipe key W. Ten different sets of 4-bit BCD codes are coded from the keyed-in numerical codes and sent to the register and comparator for checking and comparing. Meanwhile, clock signals are generated by the clock generating circuit to control the error detecting circuit. If the codes are determined to be correct, the switch control system will be turned on with the signal sent by the counter and the engine will be started with the start key. If the codes are determined to be wrong, the alarm control system will be started by the error detecting circuit and the alarm will be activated through the interface circuit. On the other hand, the write-in control circuit will be caused with the memory key to generate write-in signals to instruct the register, and the pulse signal circuit with the clock pulse generated when the numerical codes are keyed in, actuate the address control, register and write-in control to memorize the keyed-in numerical codes as a new set of codes so that the code setting can be changed after the system is turned on and the controller can be used as an anti-theft device.

As shown in FIG. 1, each of the control keys and numerical code keys is supplied with a voltage of 5 V. After being keyed into the logic integrated circuit 7 (hereafter IC), the numerical codes are coded by 16 silicon diodes 71 into different 4-bit BCD codes which are sent to the register 3 and comparator 4 for memory and comparison. When there is a numerical code keyed in, a corresponding high level, depending on the coding, will occur in the 4 lines of data codes. In other words, the 4-bit data codes are in low level when there is no signal. Once it occurs, the high level signal will be read out by the OR gate circuit 40 formed by logic gates G1, G2, G3, and initially delayed by the circuit formed by the resistors R1, R2 and capacitor C1 as shown in FIG. 1 so as to eliminate the pulse vibration at point 41 and to ensure that one keyed-in numerical code will produce one pulse at 42. Then the pulse is shaped with Schmitt gate G4 as shown at 43 and becomes a narrow low level pulse at 45 after passing through a monostable multivibrator formed by logic gates G5, G6, resistor R3 and capacitor C2. As a synchronous signal, this pulse makes the address selector control 5 to produce address conversion and causes the register 3 to read out the data code to be handled and compared with other synchronous pulses.

The register 3 is a 4-bit×4-word register used for memory and data output. Coded data is input to the register 3. The selection of address is carried out by the address selecting controller 5 which has outputs A and B. As shown in FIG. 4, the synchronous pulse signal (top waveform) is decoded by the decoder counter into address signals A and B. The output of the address signals A and B controls the address selection of the register 3. There are four addresses. Each address memorizes one set of data codes. Four kinds of address signals "00, 01, 10 and 11" are output from A and B to control the address of the register 3 and to select the contents of the data memorized. To memorize the data code with the register 3, a low level signal must be sent in by the data write-in circuit. The data write-in circuit includes the toggle functions of the 7476 J-K flip flop 2. Namely, the first pulse of signal input terminal CLK makes the output Q high and the second pulse makes the output Q low. In this way the toggle output repeats. But the J-K pin of the J-K flip flop 2 must operate in high level, so the J-K pin of the J-K flip flop 2 is connected with the output Q of the R-S latch 11. After 4 correct codes are keyed in, the output of the R-S latch 11 must be high before the J-K pin becomes high. At this time, the memory key M is pressed down and vibration is eliminated through the capacitor C4 and resistor R10. After the pulse from memory key M is shaped by the logic gate G7, it is used as toggle pulse signal of the J-K flip flop 2 and clearing and resetting signal of the system to make the output Q of the J-K flip flop 2 change to a low level. Then it works with the low level pulse signal to check the output and, through logic gates G8, G9, to control the write-in control of the register 3. Then four codes are keyed in to carry out the memory setting. After the memory setting is finished, the memory key M is pressed again to make the output Q of the J-K flip flop 2 change to a high level again to release the write-in control.

When data is keyed into the comparator 4, and the register 3 is activated by the pulse produced by the pulse generating circuit to read out the contents. The code set B in memory is sent to the comparator 4 for checking and comparing with the keyed-in code set A and set out. When the data code set A and the memory code set B are identical, i.e. A=B, the A=B pin will output a counting signal to cause the counter 6 to count. After four A=B counting signals are output to counter 6, the output Q4 of the counter 6 will have a high level and the R-S latch will be activated for locking output. When A≠B or A>B or A<B, the signal is reversed by the NOR gate 10 and sent out from the NOR gate G11 with synchronous pulse to serve as an activating signal for the alarm and, through the diode D1, to reset the counter 6. When the clear key C is pushed down, a high level signal will activate the terminal R of the R-S latches 11, 13 and reset the output Q. At the same time, it goes through the diode D4 to the address selecting control 5 to reset the address signal and goes through the diode D2 to the counter 6 to reset the counting. Namely, when the clear key C is pushed down, all the system will be reset and switching circuit 61 will be switched off.

The switching circuit 61 comprises the switching relays 31, 32, 33 for controlling the accessory switch, ignition switch and starter switch, respectively. After the four code settings are keyed in and determined by the comparator circuit to be correct, a high signal will be output to cause the output Q of the R-S latch 11 to sent out a high level signal. Through the resistor R7, the signal will activate the transistor Q2, which in turn energizes the ACC relay 31 and thus turns on the ACC switch of the car. At the same time, it will input a high level signal to terminal S of the R-S latch 13 and cause the output Q of the latch circuit to output a high signal. The Q output from latch 13 passes through resistor R8, and the high signal will thus activate the transistor Q3, which energizes the IGN relay 32, and therefore turns on the IGN switch. The start switch is controlled by the start key S. When the IGN switch is turned on and the start key S is depressed, the high level signal of 5 V will be changed to a low level signal by invertor G12. NOR gate 13 will be inversed by this signal and the low signal output by the output Q of the R-S latch 13 and output a high signal which, through the resistor R9, will activate the transistor Q4 and thus energize the start relay 33 to switch on the start of the engine. When the latch circuit of the R-S latch 13 is in reset mode or not activated, the output Q will be in low level and the output Q in high level. When the start key S is depressed, the output Q will be in the high level. Thus, NOR gate G13 will not be inversed (its output will remain low) and the starter switch S will not work. A wipe key W is provided to accommodate a circumstance of a person waiting in the car when the IGN switch is to be turned off and the ACC switch for the radio or air conditioner must be on. When the wipe key W is depressed, the signal conditioner must be on. When the wipe key W is depressed, the signal of +5 V will be input to the terminal R of the R-S latch 13, which causes the latch circuit to be in high level, and turn off the IGN switch while the ACC switch remains on. To start the engine again, the correct code must be keyed in to turn on the IGN switch. When leaving the car, the clear key C is depressed to reset all the circuits and turn off all switches but the alarm key A, which may then be depressed to turn on the alarm system 62.

When the alarm key A is depressed, the terminal R of the latch circuit of the R-S latch 12 will receive a high input to cause the output Q to become a low-level signal. The Q output is connected to resistor R6, and the high signal will thus turn off transistor Q1 and make the alarm control line 8, added with +12 V in the interface circuit 81, to be a high level so as to turn on transistor Q5 in the interface circuit 81 and thus to turn on the alarm system. If the terminal S of the R-S latch 12 is activated by the output Q of the R-S latch 11 and the output Q becomes high to turn on transistor Q1 and to ground the +12 V added by the interface circuit, the alarm control line 8 will thus become low. Thus, the transistor Q5 will be turned off and the alarm system will be turned off. In case the alarm control line 8 is cut, it will return to a high level immediately to activate the transistor Q5 of the interface circuit 81 and to turn on the anti-theft device automatically. Thus it functions to also prevent the line from being cut. Also, an error code alarm lead wire 9 is provided. In a normal state, the lead wire 9 is kept at a high level by the output of the NOR gate G14. When comparator 4 detects the output of the error code, the signal produced by the logic gates G10, G11 will, through the NOR gate G14, produce a low level pulse to activate the alarm of the anti-theft system. Since the lead wire 9 is normally in a high level, the high level of the NOR gate G14 will disappear when the lead wire 9 is cut. At this moment the bias resistor R15 of the interface circuit 81 will make the lead wire 9 drop to low level and thus activate the alarm. Corresponding with the connector at the bottom end of the car switch, a 6-hole 4-pin connector 34 is used for the switching system of this invention to facilitate installation without need to change the wiring. When the connector 34 is removed, all the code circuitry will have no +12 V power supply to make the transistor Q1 work. With the anti-theft control line 8 in high level and the lead wire 9 in low level, the alarm circuit will be activated automatically. So the alarm will be activated when the switch connector 34 is removed. With this connector 34, the switch can be controlled with the car key in case the system of this invention is out of order.

The anti-theft interface circuit 81 is provided to strengthen the car control system and to enhance the car protection. The interface circuit 81 which can be connected to any make of anti-theft device consists of an anti-theft device circuit and anti-robbery device circuit. The anti-theft device circuit has a transistor Q5 to be used as a contactless saturated switch to control the power supply of the anti-theft device 813 by using the level of the base of the transistor Q5 to determine the output of the power supply. The voltage divider circuit of the base has two resistors R11, R12. The resistor R11 causes the transistor Q5 or the anti-theft control line 8 to be a high level. The transistor Q1 determines the level of the anti-theft resistor R13 and through the changing coefficient time of the capacitor C10, the anti-robbery circuit controls the working voltage of the base of the transistor Q6. When the transistor Q5 is turned-on, and the voltage charges the capacitor C10 through the resistor R13 until the present time coefficient has elapsed, the transistor Q6 will then be turned on. The transistor Q7 will then be turned on and relay 811 will be energized. The negative pole 812 of the car ignition coil is grounded with a bypass through the resistor R14 and the ignition coil thus has no output of high voltage. As a result, the engine stops running and the anti-robbery goal is attained.

What is claimed is:

1. A button-type code car-switch controller, comprising:
    a keyboard having number keys and control keys for producing data codes;
    a logic IC operatively connected to said keyboard;
    an anti-theft device control system operatively connected to said logic IC;
    a pulse signal generating circuit in said logic IC for producing an activating pulse to cause data codes input to said logic IC from said number keys of said keyboard to be memorized and compared as the codes are keyed in;
    a counter for counting the correct data codes keyed in, and causing an output in response thereto to activate the car-switch control system;
    an error detecting circuit means for turning on an anti-theft device control system in response to the detection of the input of incorrect data codes, wherein said anti-theft device includes a line cut preventing means for activating an alarm if a line of the anti-theft device is cut;
    an interface circuit operatively connected to said error detecting means and to an anti-robbery device, said interface circuit being responsive to the input of incorrect data codes to activate said anti-robbery device;
    a write-in control circuit means in response to the signal keyed in a memory key after the keying in and acceptance of said data codes, for changing the acceptable data codes by generating a write-in signal to activate an address controller and a register from said activating pulse from said pulse control generating circuit as a numerical code is keyed in;
    wherein said switch control system includes three switch relays operated by three corresponding transistors, to control an ACC switch, an IGN switch, and a START switch, respectively, in response to a pulse produced after the input data codes are determined to be correct, and further wherein some switches are turned off with the pulse produced as a WIPE key is depressed because the pulse can switch off the IGN switch control circuit and turn off the IGN relay and START relay.

2. A button type-code car-switch controller according to claim 1 wherein the logic IC includes:
    (1) a register, 4-bit×4-word, for data memorizing and output reading out,
    (2) said address selecting controller having a decoding counter to decode the synchronous pulse signal into four address signals and, by their output, to control the address selecting of the register, and having four addresses to memorize the data codes to control the address of the register and to select the memorized data contents,
    (3) a comparator for checking and comparing the keyed-in data code and the memory code in the memory for output,
    (4) said counter for counting when a high level signal is sent in as the data code and memory code are checked to be identical, and when 4 high level signals are sent in, sending out a high level signal to control the switch system,
    (5) said error detecting circuit means having a NOR gate to inverse the data code found incorrect in comparison with the memory code, and another NOR gate to check out the synchronous pulse to activate the anti-theft system and, through the diode, to reset the counter,
    (6) a clock signal circuit detecting the corresponding high level signals of data codes coded from the keyed-in numerical codes with logic gates, and delaying the signals with the IC formed with resistors and capacitor, and changing them with the monostable multivibrator into narrow low level pulses to serve as synchronous pulses to activate the register, address selecting controller, error detecting circuit and write-in control circuit,
    (7) a data write-in circuit having a J-K flip flop with toggle function to work with the memory key to change the high level pulse into low level pulse which is checked with the synchronous pulse and sent out to activate the register, and after finishing setting the four keyed-in codes, to work with the memory key to change the low level into high level again to release the write-in control,
    (8) a system reset control being capable of producing a high-level pulse, as the clear key is depressed, to reset the output of the R-S latch, and through the diodes, to reset the address and counter, so as to switch off the switch control circuit and turn off the car switches.

3. A button-type code car-switch controller according to claim 1 wherein the anti-theft device control system includes:
    (1) an anti-theft device control wire connected to the counter through a transistor and the R-S latch at one end and to the interface circuit at the other, and, with the pulse produced by the counter and produced as the alarm key is depressed, activating the transistor to control the anti-theft device,
    (2) an error code alarm lead wire connected to the error detecting circuit and interface circuit and, with the pulse produced by the error detecting circuit, activating the alarm system.

4. A button-type code car-switch controller according to claim 1 wherein the interface circuit can turn on and off various alarm systems with the anti-theft device control circuit and the level of the two lead wires and can work together with various car alarm systems.

* * * * *